United States Patent [19]
Abney, Sr.

[11] Patent Number: 5,186,757
[45] Date of Patent: Feb. 16, 1993

[54] PIG LOADING SYSTEM AND METHOD THEREOF

[76] Inventor: Marvin D. Abney, Sr., 158 Willow Brook Dr., Gretna, La. 70056

[21] Appl. No.: 750,100

[22] Filed: Aug. 26, 1991

[51] Int. Cl.⁵ .............................................. B08B 9/04
[52] U.S. Cl. ................................. 134/8; 134/22.11; 15/104.062; 15/3.5
[58] Field of Search .................... 134/8, 22.11, 22.12; 15/104.062, 3.5, 3.51

[56] References Cited

U.S. PATENT DOCUMENTS

| | | | |
|---|---|---|---|
| 2,028,779 | 1/1936 | Howe et al. | 15/104.6 |
| 3,175,240 | 3/1965 | Hillard | 15/104.062 |
| 3,404,421 | 10/1968 | Surber | 15/104.6 |
| 3,565,689 | 2/1971 | Lowe et al. | 134/8 |
| 4,050,955 | 9/1977 | Southgate | 15/104.062 |
| 4,229,852 | 10/1980 | Brobeck | 15/3.5 |
| 4,353,414 | 10/1982 | Leitner | 134/8 |
| 4,401,133 | 8/1983 | Lankston | 15/104.062 |
| 4,457,037 | 7/1984 | Rylander | 15/104.06 |

Primary Examiner—Theodore Morris
Assistant Examiner—Saeed T. Chaudhry
Attorney, Agent, or Firm—C. Emmett Pugh

[57] ABSTRACT

An apparatus for inserting pigs for the cleaning, purging and dewatering of hydrocarbon conveying pipelines and the like and more particularly to an improved pig launcher or loader for loading a pig into a variety of configuration pipelines. The present invention teaches a portable device configured to affix to various configuration pipes via a unique configured flange coupling system, which adapts to the flange connections for various diameter pipes. The present invention also utilizes a compressed air system for loading the pig into the pipeline, and an automatic system for venting the charged pig loader once the pig has passed from the loader into the pipeline. The present invention teaches a device configured for the loading of several pigs simultaneously, and is not limited to the loading of a single pig at a time. Further, the present apparatus loads the pig(s) well into the pipeline, allowing for less problems during the cutting and welding process. Still further, the present invention is configured to affix to a cut end of the pipeline if necessary, and will insert the pig into the pipe in vertical and horizontal positions. The present invention provides an inexpensive, portable, effective system for the launching or loading of pigs and like cleaning devices from pipelines four inches in diameter on up. Its portability allows its use in areas heretofore unavailable or too costly for a permanent pig loading, greatly decreasing the cost of the operation.

9 Claims, 2 Drawing Sheets

PIG LOADING SYSTEM AND METHOD THEREOF

BACKGROUND OF INVENTION

1. Field of Invention

The present invention relates to apparatus and systems for the cleaning, purging, internal sizing and dewatering of hydrocarbon conveying pipelines and the like and more particularly to an improved pig launcher or loader for loading a pig into a variety of location and configuration pipelines.

The present invention teaches a portable device configured to affix to various location and configuration pipes via a unique configured flange coupling system, which adapts to the flange connections or to pipe without flange for various diameter pipes. The present invention also utilizes a compressed air, water or manual system for launching or loading the pig into the pipeline, and an automatic vent system for safely venting the charged pig loader once the pig has passed from the loader into the pipeline.

The present invention teaches a device configured for the launching or loading of several pigs simultaneously, and is thereby not limited to the loading of a single pig at a time like much of the prior art contemplates. Further, the present apparatus as configured loads the pig(s) well into the pipeline if used in the manner contemplated, allowing for greater time savings during the installation process.

Further, the present invention as designed does not require that there be a flange at the pipeline for connection purposes; the present invention is configured to affix to a cut end of the pipeline if necessary, and will insert the pig into the pipe in vertical as well as horizontal positions.

The present invention as configured provides an inexpensive, portable, effective system for the launching or loading of pigs and like cleaning devices into pipelines four inches in diameter on up. It's portability allows its use in areas above and below water for pig loading, greatly decreasing the cost of the operation in areas where there is no need for installing a permanent pig launching facility.

2. Prior Art & General Background

While the prior art may contemplate the generalized concept of a pig launching or loading system, it has not taught or otherwise disclosed the pig loader of the present invention, or a system otherwise configured to portably communicate with a variety of diameter pipelines, with or without flanges, below or above water nor has the prior art taught the automatic venting action of the present invention, or any variations thereto.

As will be seen upon a review of the below, the prior patents and other known teachings are apparently limited to permanent, fixed launching structures which have been designed specifically for a particular flange coupling on a pipeline, and therefore has not offered any versatility with regard to single launchers being adaptable to various diameter pipelines or flange connections above or below water.

A list of prior patents which may be of interest is presented below:

| Patent No. | Patentee(s) | Issue Date |
|---|---|---|
| 4,759,579 | Swenson, L. | 07/26/1988 |
| 4,736,482 | Lankston, R. | 04/12/1988 |
| 4,457,037 | Rylander, N. | 07/03/1984 |
| 3,720,228 | Wheatly, Jr | 03/13/1973 |
| 3,404,421 | Surber, J. A. | 10/08/1968 |
| 3,139,932 | Johnson, G. D. | 07/07/1964 |
| 2,028,779 | Howe Et Al | 01/28/1936 |

As may be discerned from a review of the foregoing, the prior art is yet to contemplate a portable, relatively inexpensive and effective means for launching a pig into a variety of diameter of configuration pipelines above and below water, and is in fact limited to fixed structures which are costly and unnecessary limited application.

For example, U.S. Pat. No. 2,028,779 issued 1936 teaches a pig loader which utilizes a winch apparatus for plunging the pig into the system for launching same. Further, the 779 reference is clearly not designed with portability in mind, being bulky and permanent in structural application, and does not contemplate adapting to fit a variety of flange sizes, or for that matter, a cut pipe without a flange or below water application.

U.S. Pat. No. 4,457,037, issued 1984 and entitled "Sphere Launching Apparatus", teaches a "sphere launching apparatus for selectively admitting spheres into a pipeline and comprising an angularly disposed support or track for storing a plurality of the spheres thereon.. for releasing a single sphere at a time.."

Like the '779 reference, '037 contemplates a rather elaborate and bulky system which is inherently non-portable, and is by its design limited to only a certain diameter pipeline; further, it appears that the '037 reference will not operate with cylindrical pigs, being specifically designed for use with spheres and the like and is for use only above water.

Lastly, U.S. Pat. No. 3,404,421 issued 1968 entitled "Apparatus for Launching Objects Within a Pipe Line" teaches a system which may utilize the gas pressure of the hydrocarbon pipeline for forcing the pig into the pipeline. Also taught is a pressure actuated plunger mechanism for sliding the pig into position. Again, however, this apparatus does not teach a portable device designed to fit a variety of diameter pipelines, with or without flanges, nor is it able to insert pigs under water. Further, the '421 reference as taught is inherently bulky and permanent in its operative nature.

3. General, Summary Discussion of the Invention

The present invention overcomes these prior art problems by providing a system which is highly reliable in operation, rugged and portable in construction, relatively economical and very cost effective in its design, which allows for greater time savings and can be used with a multitude of diameter pipes with or without flanges, above or below water.

The present invention as configured teaches a system which may launch one or many pigs, incorporating a plurality of interchangeable sections for providing various differing features, such as variable size main barrels, reducer sections, or flange sizes.

Further, the present invention, in addition to using hydrostatic pressure for forcing the pig into the pipeline, also teaches the additional feature of an optional plunger mechanism for complimenting or replacing the hydrostatic pressure loader in particularly difficult loadings.

The system as configured may be pre-loaded with pigs at the shop, transported to the job site, affixed to the pipeline, the pig then inserted, removed, and transported for another loading to a different pipeline, all with perhaps less time and effort than loading with traditional pig launchers that have to be a one time fabrication for each case, and certainly at a lesser cost.

Unlike the prior art, the present invention teaches the utilization of a mounting plate which includes slotted apertures configured for allowing the bolting of the present system to various sized flange plates. Further included in the mounting plate is bleed off bars which allow the release of excess pressure from the pig launcher once the pig has been loaded into the system, providing a safe, automatic bleeding of the excess pressure in the launcher prior to removal.

The present system also is designed so that it may be installed and utilized under water with nominal effort, unlike the above prior art systems, which were by design configured for use out of the water.

It is thus an object of the present invention to provide a pig launching or loading system which may be utilized with a variety of size flanges on a variety of diameter pipelines, and further may be inserted in a pipe without a flange.

It is another object of the present invention to provide a portable pig launcher system which is rugged and easily installed.

It is another object of the present invention to provide a portable pig launcher system which may be pre-loaded with the pig(s), and transported to the loading site and installed, and once launched be removed to another site for launching still another pig, without undue installation effort or cost.

It is still another object of the present invention to provide a portable pig launcher system which may be utilized under water.

It is still another object of the present invention to provide a portable pig launcher system which may launch a variety of configured pigs.

It is another object of the present invention to provide a pig launcher system which will insert a pig into a pipeline already filled with fluid.

It is an object of the present invention to provide a portable pig launching system which has low maintenance requirements and is configured to be interchangeable relative barrel length and reducer size, as well as flange plate configuration.

Lastly, it is an object of the present invention to provide a pig launching system which provides a efficient means of launching a variety of configured and numbered pigs in various configured pipelines, at a significantly reduced cost over traditional, stationary systems that in most cases have to be fabricated, removed and discarded after use.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein.

DETAILED DESCRIPTION OF THE PREFERRED, EXEMPLARY EMBODIMENT(S)

Figure 1:
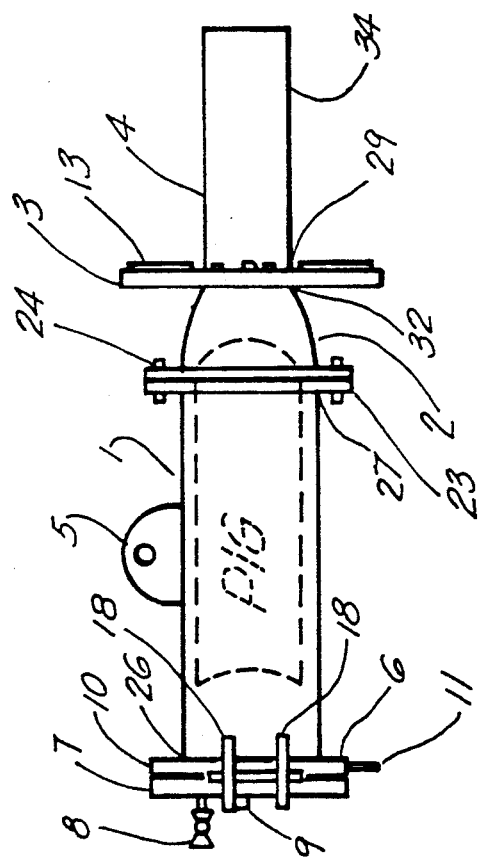
FIG. 1 is a side view of the preferred embodiment of the pig launching system of the present invention, illustrating the launcher affixed to an exemplary pipeline, with a loaded pig in phantom.

As can be seen in FIG. 1, the pig launcher or loader L of the preferred, exemplary embodiment of the present invention, includes an elongated pig barrel I having rear 26 and front 27 ends, and having an generally cylindrical internal wall with a diameter configured to communicate with the surface of the pig, shown in phantom, as well as sufficient length to accept at least a single pig.

Affixed to the outer wall of the barrel 1 is pad eye 5, configured for lifting the present device into position for installation or travel.

Communicating with the front end of barrel 1 is barrel plate 23, configured to communicate with reducer 2 via reducer plate 30 with gasket 25 of rubber or the like juxtaposed therebetween. Stud bolts and nuts 24 threadingly engage to hold the reducer 2 and the barrel 1 together via barrel 1 and reducer 30 plates.

The reducer 2 comprises a tapered midsection 33, a rear body end 31, and a front nozzle end 32, which has a lesser internal diameter than the rear body end 31. Adjoining the front nozzle end 32 is nozzle flange 3, having gasket 29 juxtaposed therebetween. Nozzle barrel 4 is joined to reducer 2 via nut and bolt arrangement.

Figure 2:
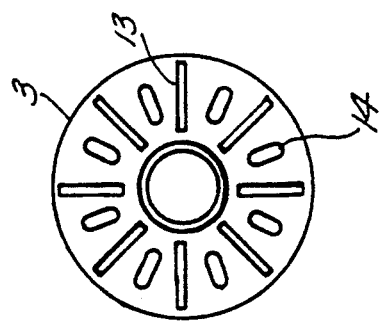
FIG. 2 is a frontal view of the nozzle flange of the invention of FIG. 1, illustrating the slotted flange coupling apertures and pressure relief bars.

As may be seen in FIGS. 1 and 2, Incorporated into nozzle flange 3 are a plurality of anti-pressure relief bars 13 configured for allowing the escape of excess pressure from the interior of the system once the pig has been launched, comprising merely vents from the internal walls of the flange 3 to its exterior walls.

Further included in nozzle flange 3 are a plurality of slotted bolt holes 14 for allowing the flange to threadingly communicate with various diameter pipes for installation, so that the flange does not have to match exactly for mating. Note that the bolt holes are somewhat linear in configuration to allow for a variety of pressure rated flanges, as opposed to single tap holes, which would not allow for variable size pressure rated flanges.

Nozzle barrel 4 is configured such that the outer wall 34 is of less diameter, for example, one sixteenth (1/16") to generally about one-eighth (⅛") less, than the inner wall of the pipe which is to receive the pig, so that barrel 4 may be placed inside the pipe for loading. As configured, barrel 4 allows the pig to be deposited a desirable distance within the pipe, so that it will not interfere with bolting, cutting or welding of the open end of the pipe once the pig loading operation is complete. While the barrel 4 may be weldingly affixed to nozzle flange 3, it may also be joined via nut and bolt arrangement, with gasket 29 therebetween.

Figure 4:
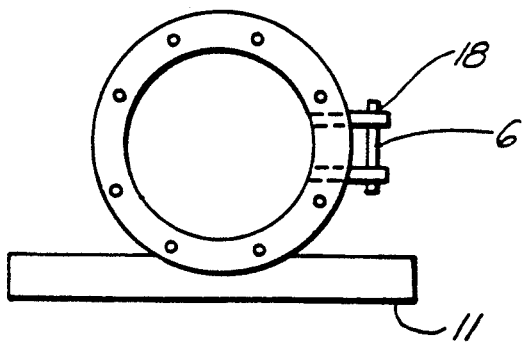
FIG. 4 is a rear view of the barrel flange of the invention of FIG. 1, illustrating the positioning of the anti-roll plate.

As shown in FIGS. 1 and 4, barrel flange 6 is adjoined to the rear end 26 of the pig barrel 1. This preferred embodiment of the present invention includes on the lower periphery of the barrel flange 6 an anti-roll plate 11, for preventing rolling of the unit during transport and in unstable conditions.

Affixed to the face of the flange 6 distal the pig barrel 1 is gasket 10 of rubber or like pliable, yet resilient material for providing a seal when juxtaposed barrel flange 6 and the closed door flange 7.

Figure 3:
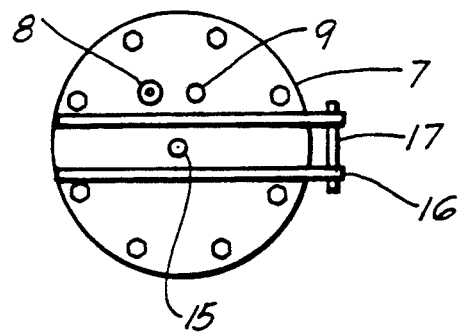
FIG. 3 is a rear view of the door flange of the invention of FIG. 1, illustrating the positioning of the bleed valve, air connection, and jacking coupling.

Door flange 7 forms the rear door for the present system, and is configured to hingedly engage the barrel flange 6 in face to face engagement via door hinge 18, locking in place with door hinge bolt 17, as shown in FIG. 3.

As further shown in FIG. 3, bleed valve 8, air connection 9 and jacking coupling 15 are components of door flange 7, aiding in the pig loading operation of the present invention. The bleed valve 8 utilized in the exemplary embodiment comprises a standard ball-type valve, and the bleed valve 8 and air connection 9 will be discussed in more detail below in the discussion of the system of the present invention.

Figure 5:
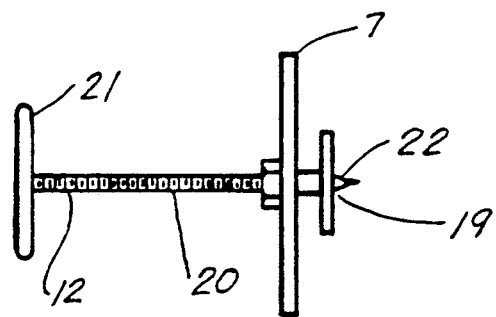
FIG. 5 is a side view of the manual jacking accessory of the present invention, illustrating various component parts including the jacking rood, hand wheel, push plate, and center pin, and its position relative the door flange of the invention of FIG. 1.

FIGS. 3 and 5 further illustrate the jacking coupling 15 and the optional manual jacking system 12 of the present invention. The jacking system 12 is configured to assist, compliment, and in some cases, operate in lieu of the compressed air or water system for loading the pig, providing a physical means of forcing the pig through the loader into the pipe.

The jacking system 12 comprises a jacking rod 20 which threadingly communicates through the door flange via turning of hand wheel 21, located outside the launcher to push plate 19 against the pig. Center pin 22 contacts the pig base, holding it in place and preventing slippage.

In operation, the pig is loaded into the pig barrel 1 either 5 at the shop or in the field. If two pigs are desired to be loaded simultaneously, the reducer 2 section is removed and replaced with an elongated reducer, and one of the two pigs to be loaded is placed in the elongated reducer, the other placed in the pig barrel 1, and the door flange 7 secured closed via door hinge 16 and door hinge bolt 17. All pigs should be lubricated with a non-combustible substance such as soap or the like to aid in the installation process.

In installation, the nozzle barrel 4 of the loader is placed in the opening of the pipe to be loaded, until the nozzle flange 3 communicates with the pipe flange. The two flanges are then threadingly connected via slotted bolt holes 4 as shown in FIG. 2.

Once connected, it is merely a matter of connecting the hydrostatic pressure source to the air connection 9 of the door flange 7, initiating up to one hundred pounds pressure or less, and allowing the pig(s) to be forced down the pig barrel, throughout the reducer 2 and nozzle barrel 4 and into the pipe. Once the pig has passed through the reducer 2 and the nozzle flange 3, the system automatically begins to vent the pressure via anti-pressure relief bars 13. The pressure medium utilized in the present system may consist of compressed air, but may also comprise CO2, argon, water; nitrogen, or other non-flammable and non-toxic fluid further, the compressed air may be generated via air compressor or bottle, whichever is more convenient or more cost effective. The compressed air or other fluid medium may be up to on the order of 120 psi, for example.

If the pig becomes blocked for whatever reason, the pressure may be vented via bleed valve 8 on rear door flange 7; if assistance is needed to force the pig through the reducer 2, the optional manual jacking system 2, illustrated in FIG. 5 and discussed supra, may be utilized.

If the pipe which the pig is to be installed in does not have a connecting flange, the present system may be utilized to load some of the smaller pigs by holding or standing the loader in place, with the nozzle barrel communicating with the inner wall of the pipe, and initiating the normal installation sequence.

The present system may be utilized in most all locations, including under water, and is suitable for all types of pigs, including foam pigs, cup pigs, sphere pigs, an scraper pigs. While the exemplary embodiment of the invention is made of aluminum to provide light weight to this portable system, stainless steel would also be quite desirable because of its durability.

The embodiment(s) described herein in detail for exemplary purposes are of course subject to many different variations in structure, design, application and methodology. Because many varying and different embodiments may be made within the scope of the inventive concept(s) herein taught, and because many modifications may be made in the embodiment(s) herein detailed in accordance with the descriptive requirements of the law, it is to be understood that the details herein are to be interpreted as illustrative and not in a limiting sense.

What is claimed is:

1. A portable pig launcher for launching a pig into a pipeline having an inner wall and an opening, comprising:

a pig barrel having a generally cylindrical inner wall, and front and rear ends, said rear end further comprising a fluid impermeable door;

a reducer having a front end, a rear end, a tapered midsection, and a generally radially tapered inner wall, wherein said rear end is of greater diameter than said front end, said rear end communicating with said front end of said pig barrel such that the inner wall of said pig barrel and inner wall of said reducer engage to form a single conduit;

a nozzle barrel having a generally cylindrical inner wall of lesser diameter than the inner wall of said pig barrel and an outer wall at least one sixteenth of an inch lesser diameter than the inner wall of said pipeline, said nozzle barrel configured to engage said inner wall of said pipeline via said opening in said pipeline;

means for applying a hydrostatic pressure within said pig barrel, for forcing the pig out of said pig barrel, reducer and nozzle barrel;

means for automatically venting said hydrostatic pressure once said pig has passed through said pig barrel and reducer comprises a nozzle flange, said nozzle flange comprising at least one anti-pressure relief bar, said nozzle flange juxtaposed said nozzle barrel and said reducer; and flange connecting means for removeably connecting said nozzle flange to various pipe flanges of differing diameters.

2. The portable pig launcher of claim 1, wherein said hydrostatic pressure is comprised of CO2, argon, nitrogen, water.

3. The portable pig launcher of claim 1, wherein said hydrostatic pressure is comprised of compressed air, and said means for applying a hydrostatic pressure comprises an air compressor or compressed air bottle or tank in fluid communication with said rear end of said pig barrel.

4. The portable pig launcher of claim 1, wherein said rear door comprises a fluid connector for accepting said means for applying hydrostatic pressure within said pig barrel, and a bleed valve for selectively venting said means for applying hydrostatic pressure within said pig barrel.

5. The portable pig launcher of claim 1, wherein said fluid impermeable door of said pig barrel further comprises a jacking coupling.

6. The portable pig launcher of claim 5, wherein there is further included a manual jacking system for pushing the pig through the pig barrel, comprising a jacking rod configured to threadingly communicate through said fluid impermeable door of said pig barrel via said jacking coupling, said jacking rod having first and second ends, said first end having a hand wheel affixed thereto, said second end having a push plate.

7. The portable pig launcher of claim 1, wherein there is further included an anti-roll plate.

8. A method of launching a pig in a pipeline having an inner wall and an opening, comprising the following steps:
   (a) providing a pig;
   (b) providing a portable pig launcher, comprising:
      a pig barrel having a generally cylindrical inner wall, and front and rear ends, said rear end further comprising a fluid impermeable door;
      a reducer having a front end, a rear end, a tapered midsection, and a generally radially tapered inner wall, wherein said rear end is of greater diameter than said front end, said rear end communicating with said front end of said pig barrel such that the inner wall of said pig barrel and inner wall of said reducer engage to form a single conduit;
      a nozzle barrel having a generally cylindrical inner wall of lesser diameter than the inner wall of said pig barrel and an outer wall at least about one sixteenth of an inch lesser diameter than the inner wall of said pipeline, said nozzle barrel configured to engage said inner wall of said pipeline via said opening in said pipeline, said pipeline having a pipeline flange with tap holes at the opening;
      means for applying a hydrostatic pressure within said pig barrel for forcing the pig out of said pig barrel, reducer and nozzle barrel; and
      means for automatically venting said hydrostatic pressure once said pig has passed through said pig barrel and reducer, said means for automatically venting said hydrostatic pressure further comprising a nozzle flange, said nozzle flange comprising at least one anti-pressure relief bar, said nozzle flange being juxtaposed to said nozzle barrel and said reducer, said nozzle flange further comprising a series of slotted bolt holes configured to communicate with various pipe flanges of differing pressure ratings and diameters;
   (c) opening the fluid impermeable door of said pig barrel;
   (d) placing said pig into said pig barrel;
   (e) placing said nozzle barrel in the opening of said pipeline such that said nozzle barrel communicates with said inner wall of said pipeline, and sliding said nozzle barrel within said opening of said pipeline until said nozzle flange communicates with said pipeline flange;
   (f) applying up to about 120 pounds of hydrostatic pressure in said pig barrel;
   (g) launching said pig out of said pig barrel and reducer; and
   (h) beginning to vent said hydrostatic pressure, while continuing to apply sufficient hydrostatic pressure to force said pig out of said nozzle barrel into said pipeline.

9. The method of launching a pig of claim 12, wherein there is included the further step of threadingly joining said nozzle flange to said pipeline flange via nut and bolt arrangement passing through said slotted bolt hole of said nozzle flange and said tap hole of said pipeline flange.

* * * * *